United States Patent [19]

Neveux

[11] 4,210,833
[45] Jul. 1, 1980

[54] MOTOR-FAN UNIT WITH COOLED MOTOR

[75] Inventor: Rene R. Neveux, Les Clayes-sous-Bois, France

[73] Assignee: Societe Anonyme Francaise du Ferodo, Paris, France

[21] Appl. No.: 858,062

[22] Filed: Dec. 6, 1977

[30] Foreign Application Priority Data

Dec. 13, 1976 [FR] France .............................. 76 37451

[51] Int. Cl.² .............................................. H02K 9/00
[52] U.S. Cl. ...................................... 310/58; 165/121; 417/368
[58] Field of Search ....................... 310/67, 58, 59, 62, 310/63, 72, 52; 417/368; 165/121

[56] References Cited

U.S. PATENT DOCUMENTS

| 1,645,064 | 10/1927 | Lewinner | 310/62 |
| 2,012,745 | 8/1935 | Findley | 165/121 |
| 2,294,586 | 9/1942 | Troller | 310/62 |
| 2,690,513 | 9/1954 | Tamm | 310/62 |
| 3,303,995 | 2/1967 | Boeckel | 417/368 |
| 3,518,468 | 6/1970 | Wightman | 310/63 |

Primary Examiner—R. Skudy
Attorney, Agent, or Firm—Neil F. Markva

[57] ABSTRACT

Motor-fan unit, particularly for the cooling of the circulation water of an automobile vehicle motor, comprising a helicoid fan driven by an electric motor. A centrifugal interior blading draws air through the electric motor to cool it. The motor is fixed in a housing having at least one lateral opening for air entry which is located radially opposite a cavity formed in an arm connecting the housing to a collar which surrounds the helicoid fan. The cavity has a generally U-shaped section with its concavity turned downstream of the flow of air drawn in by the helicoid fan.

2 Claims, 5 Drawing Figures

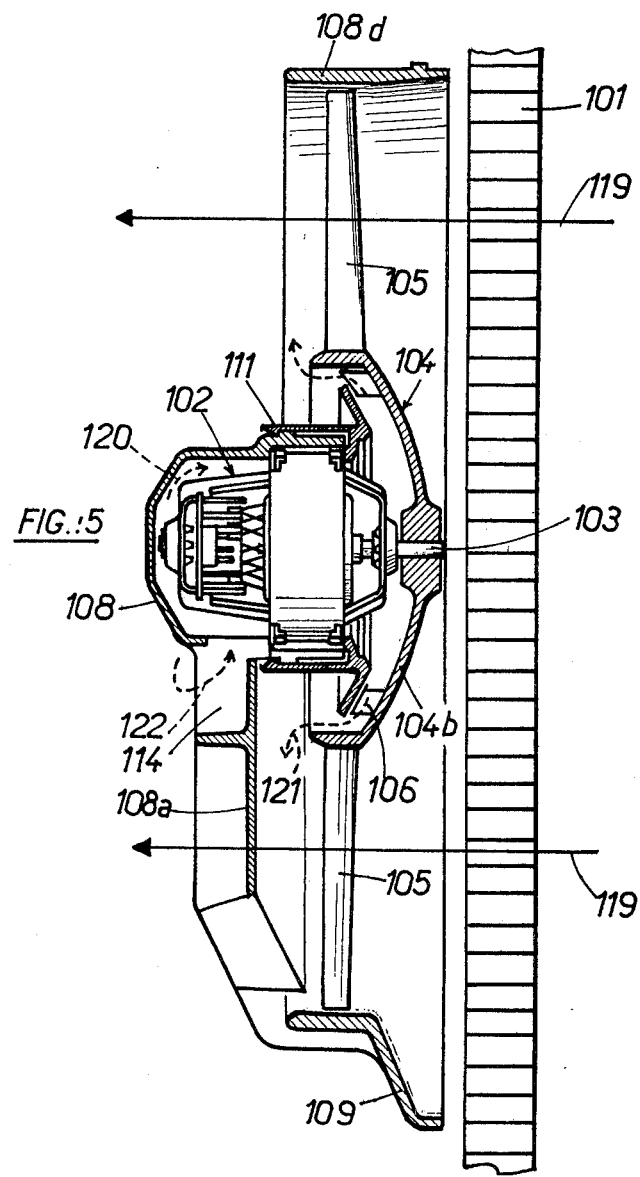

MOTOR-FAN UNIT WITH COOLED MOTOR

BACKGROUND OF THE INVENTION

The invention relates to motor-fan units comprising a helicoid fan driven by an electric motor, and applies to those which are used to cool the motors of automobile vehicles. More precisely, it concerns the cooling of the electric motor.

Often this cooling cannot be ensured by the air stream created by the fan thereby posing problems. As a motter of fact, it is known that a helicoid fan has an output distinctly lower near its hub than near its periphery, which leads to the hub being given a relatively significant diameter, so that it produces a mask effect and so that the air stream circulating against or in the electric driving motor may be insufficient to cool it properly. It is particularly the case with motor-fan units used for producing or speeding up the air stream passing through the radiator for cooling the circulation water of an automobile vehicle motor, in which the electric motor driving the fan often works with a mediocre efficiency and consequently dissipates a relatively significant quantity of energy as heat.

On the other hand, when an automobile vehicle travels in fog or rain, the flow of cooling air entrains water droplets which have to be prevented from coming into contact with the electrical circuits of the motor. In addition, the fan of a cooling apparatus is placed either in front of the radiator in order to blow the air through the latter or behind in order to draw the air through it. In the first instance, the electric motor is often at the suction side of the fan while in the second instance, the motor is often at the output side. The cooling apparatus of the electric motor must therefore be installed with due regard paid to the direction of the flow, in relation to this motor, of the air stream created by the helicoid fan.

One of the aims of the invention is to allow realization of a helicoid motor-fan unit whose motor is efficiently cooled. Another aim is to ensure the cooling by air of the electric motor of a helicoid motor-fan unit, without risk of this air entraining water droplets into the electrical circuits of the motor. Yet another aim is to allow realization of a helicoid motor-fan unit whose electric motor is cooled efficiently by air without risk of water being thrown into the electrical circuits of the motor, and that the latter be placed at the output side or at the suction side of the helicoid fan.

It has been proposed to place passages in the hub or in the neighborhood of the axis of the helicoid fan to form a centrifugal or heliconcentrifugal fan driving back in the same direction as this helicoid fan. The proposal has been made to either increase the output and the output pressure in a helicoid fan, or lessen the resistance given to the outflow of an airstream by a helicoid fan when arrested or winddriven, while avoiding driving air back upstream.

SUMMARY OF THE INVENTION

In conformance with the present invention, a centrifugal interior blading is connected in the same way to the helicoid fan. However, the fan draws the air through the electric motor to cool it. The motor is fixed in a housing having at least one lateral opening for air entry located radially opposite a cavity formed in an arm connecting the housing to a collar which surrounds the helicoid fan. The cavity has a generally U-shaped section with its concavity turned downstream of the flow of air drawn in by the helicoid fan.

BRIEF DESCRIPTION OF DRAWINGS

The description which follows with regard to the attached drawings, given by way of non-limiting examples, will allow full comprehension of the advantages of the invention and the art of realizing it, all detail which belongs as much to the figures as to the text falling, of course, within the scope of the said invention.

FIG. 3 is a partiel view in elevation along the arrow III of FIG. 1.

FIG. 4 is a view in section on a larger scale along the line IV—IV of FIG. 3.

FIG. 5 is a view similar to FIG. 1, showing a motor-fan unit mounted behind a radiator in order to draw the air through the latter.

DETAILED DESCRIPTION

Figure 1:
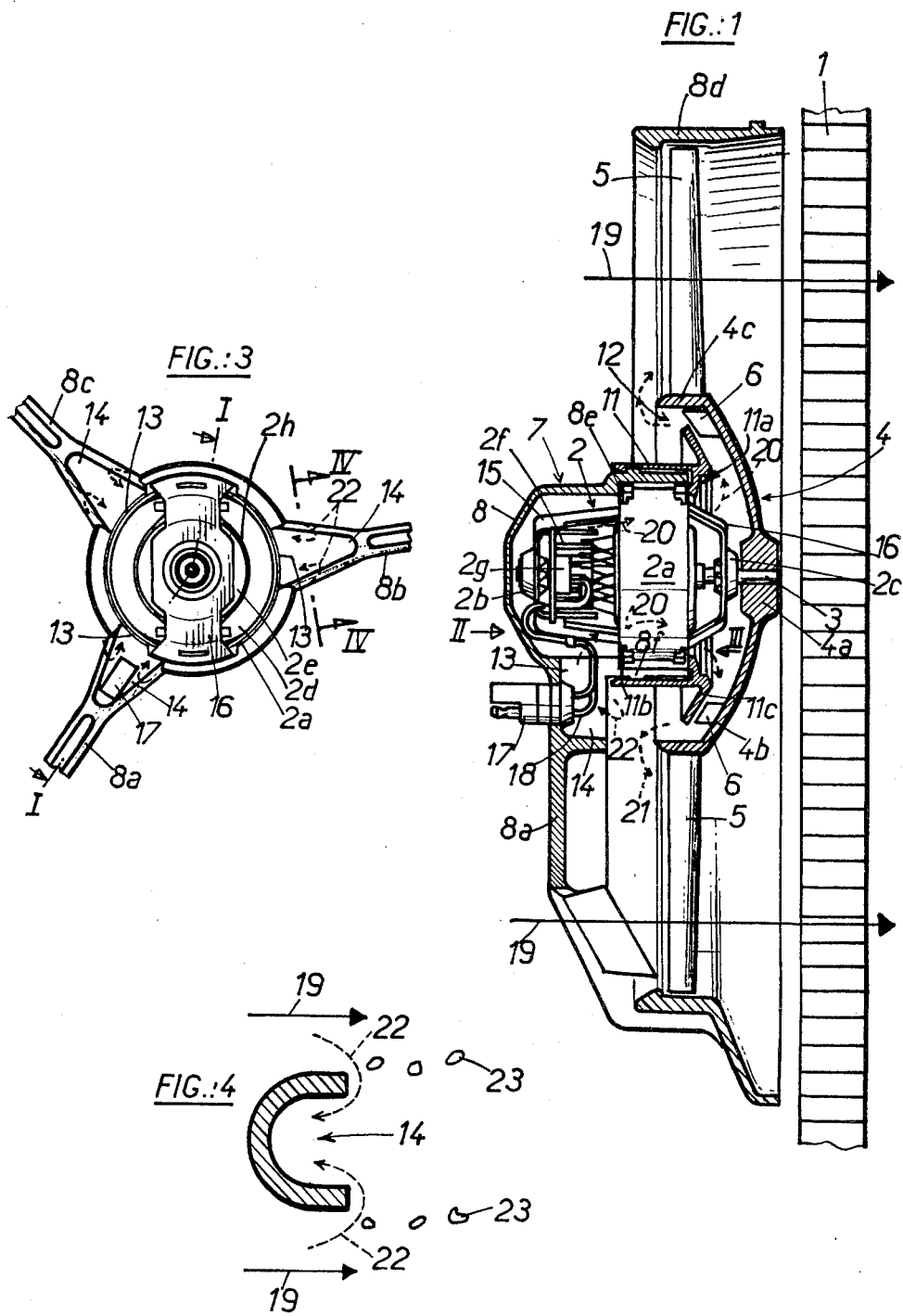
FIG. 1 is a view in axial section along the line I—I of FIGS. 2 and 3, showing a motor-fan unit according to the invention, mounted in front of an automobile vehicle radiator in order to blow the air through it.
Figure 2:
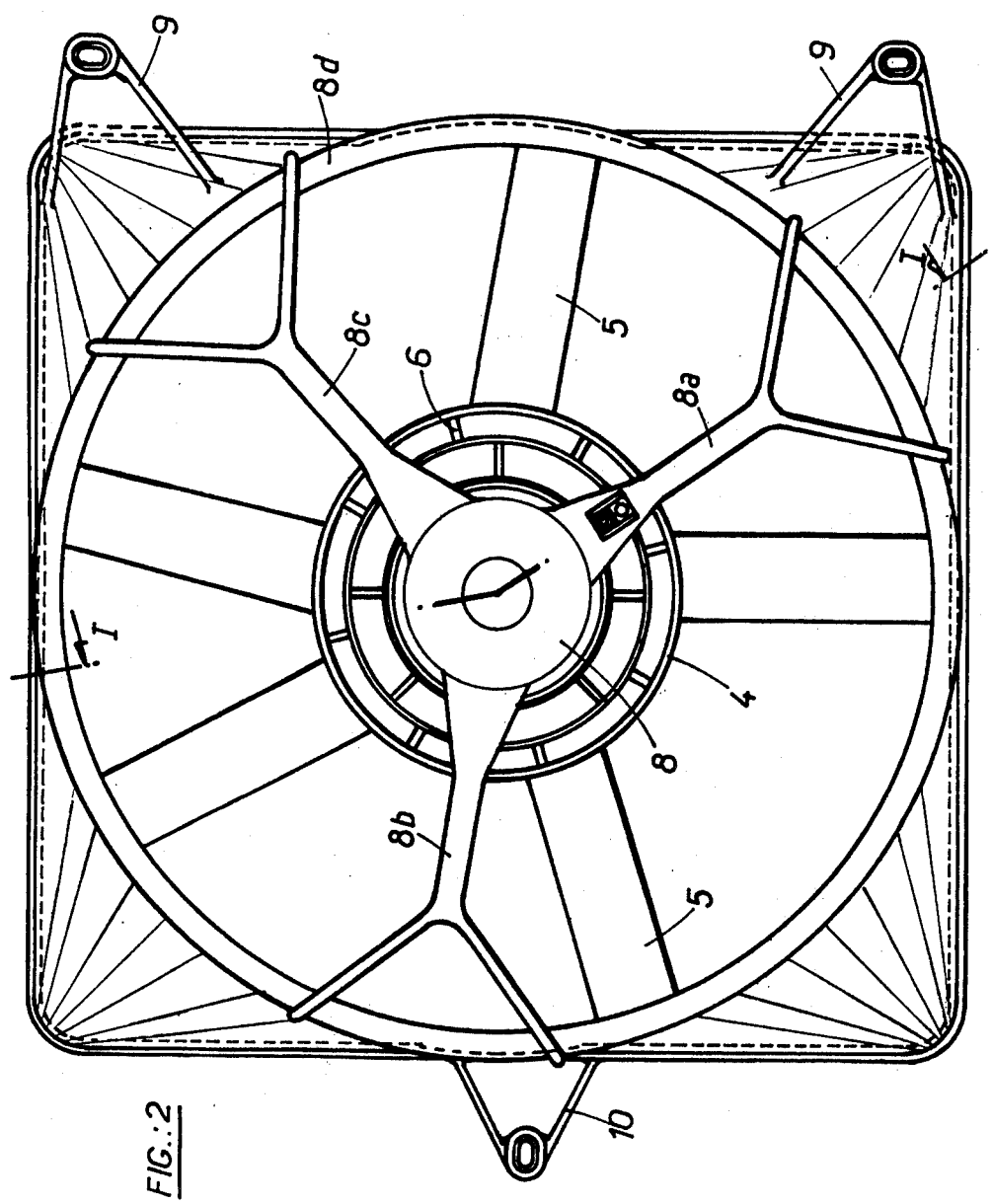
FIG. 2 is a view in elevation along the arrow II of FIG 1.

The motor-fan unit of FIGS. 1 to 4 is intended to be mounted in front of a radiator 1. Thus, air is blown through radiator 1 in which the cooling water of an automobile vehicle motor circulates. The motor-fan unit comprises an electric motor 2 on shaft 3 which carries hub 4a of rotor 4. Vanes 5 of a helicoid fan and a centrifugal interior blading 6 are mounted on rotor 4. The rotor 4 comprises a solid circular wall 4b solid with hub 4a and peripheral part 4c which is turned back toward motor 2. The solid circular wall 4b projects very widely all around motor 2. Vanes 5 are fixed to the exterior of peripheral part 4c and blades 6 are fixed to the interior wall 4b.

The motor 2 is fixed in a housing 7 having two parts. The front part 8 of housing 7 is in the shape of an enveloping dome. Three arms 8a, 8b, 8c connect front part 8 to a collar 8d which surrounds the helicoid fan formed by vanes 5 and includes fixing lugs 9 and 10 (see FIG. 2). The back part 11 of housing 7 is engaged around front part 8 on the side of motor 2 having shaft 3. Resilient abutments 11a are disposed inside back part 11 and cause the magnetic ring 2a of motor 2 to rest against an interior shoulder 8a of front part 8. Rib 8f is disposed externally of front part 8 and resiliently surmounts a step 11b of back part 11. Rib 8f becomes latched behind step 11b when back part 11 is engaged to front part 8. Motor 2 is thus fixed in housing 7. The back end of back part 11 of housing 7 includes a truncated-conical skirt 11c widening toward the front of the unit. An annular outlet orifice 12 is formed by skirt 11c with rotor 4. Air is drawn through orifice 12 by the centrifugal blading 6 as will be explained later.

The front part 8 of housing 7 includes, laterally, three openings 13, each of which is located radially opposite a cavity 14 made in one of the arms 8a, 8b, 8c. These cavities 14 (see particularly FIG. 4) have a U-shaped section whose arms are directed backwards.

Motor 2 is of the open type having its electrical circuits freely exposed to the atmosphere inside housing 7. Stirrups 15 and 16 support front bearings 2b and back bearings 2c, respectively. Field magnets 2a and 2d are supported at clearance 2h with armature 2e and commutator 2f. Motor electric supply (not shown) leads into a connector 17 fixed in cavity 14 of arm 8a. Connector 17 is connected to brush-holder 2g by conductors 18 passing into the corresponding opening 13.

When the motor-fan is in action, vanes 5 create or accelerate a principal flow of air blown from front to back on radiator 1. The centrifugal blading 6 draws in a second flow of cooling air for motor 2 (flow represented diagrammatically by the arrows 20). Flow 20 enters by openings 13, washes over commutator 2f and connected conductors 18 in passing, crosses armature 2e and clearance 2h before issuing into the space located between motor 2 and the circular wall 4b. Flow 20 of cooling air is driven back in direction 21 through annular orifice 12 and is then taken up again by vanes 5.

The cooling air of motor 2 enters thus through openings 13 and is taken from the principal flow 19 drawn from front to back by vanes 5. FIG. 4 shows a change of direction 22 of 180° for the cooling air to enter from back to front into cavities 14. In this change of direction, the air gives up the water droplets 23 that are brought with it and shown tending to continue their course toward the back of the unit. The air flow 20 consequently runs no risk of throwing water into the active parts of motor 2.

FIG. 5 shows elements playing the same part as in the preceding figures designated by the same reference numbers increased by 100 units. In this embodiment, the motor-fan unit is intended to be mounted behind radiator 101 to draw the air through it. The motor 102 is here protected by the solid circular wall 104b against the direct intromission of water droplets contained in the principal air flow 119. The flow 120 of cooling air for motor 102 enters from back to front, at 122, into cavities 114. Consequently, air 122, taken from principal flow 119 which flows from front to back, again gives up water droplets it contains.

Therefore, theoretically at least piece 8 (cavities 14 turning their concavity toward vanes 5) may be replaced by piece 108 (cavities 114 turning their convexity toward vanes 5) while reversing the direction of rotation of the motor involved, when changing the installation from FIG. 1 to that of FIG. 5. However, an identical profile for vanes 5 does not allow the obtaining of a good output in the two directions of rotation. In practice, consequently, there will be a preference for providing the two types of pieces 8 and 108 and two types of fan 4 and 104 whose vanes 5 and 105 are suitable respectively for that installation of FIG. 1 and for that of FIG. 5, and a single type of motor 2 and piece 11 equally able to receive a piece 8 or 108 and a fan 4 or 104 of one type or the other.

What is claimed is:

1. In a motor-fan unit for an automobile engine cooling system, said unit comprising an electric motor, a rotary helicoid fan driven by said electric motor, a rotary centrifugal blading fitted in a central area of said helicoid fan and driven in conjunction therewith by said electric motor, and means whereby the air sucked by said centrifugal blading is caused to flow over said electrical motor and cool the same, the combination comprising:
   (a) an inner housing surrounding said electric motor and having at least one lateral air inlet,
   (b) an outer shroud surrounding said helicoid fan,
   (c) at least one arm bracing said outer shroud to said inner housing and extending generally radially opposite said lateral air inlet, and
   (d) said arm including a generally U-shaped cavity having its concavity opening in the direction of the air flow that is circulated by said helicoid fan,
   (e) said cavity being effective to cause air sucked into said cavity through said lateral air inlet to move along a tortuous path.

2. In a motor-fan unit as claimed in claim 1, wherein a rotatable circular wall extends around said housing and is drivable by said electric motor,
   said helicoid fan having vanes integral with and projecting outwardly from said circular wall towards said shroud.

* * * * *